United States Patent [19]

Saxon

[11] 3,750,506
[45] Aug. 7, 1973

[54] APPARATUS FOR CUTTING ELBOW SECTIONS FROM PIPE

[76] Inventor: Denver D. Saxon, 4384 Glenwood Pky., Dekalb City nr. Decatur, Ga.

[22] Filed: Feb. 8, 1971

[21] Appl. No.: 113,552

Related U.S. Application Data

[62] Division of Ser. No. 735,903, June 10, 1968, Pat. No. 3,589,220.

[52] U.S. Cl. ............................................. 82/101 R
[51] Int. Cl. ............................................. B23b 3/04
[58] Field of Search .............. 82/46, 47, 74, 70.2, 82/101

[56] References Cited
UNITED STATES PATENTS

| | | | |
|---|---|---|---|
| 3,128,659 | 4/1964 | Judelson | 82/46 |
| 3,208,320 | 9/1965 | Anderson | 82/101 X |
| 3,304,819 | 2/1967 | Pasternack | 82/101 X |
| 2,810,187 | 10/1957 | Klein | 82/101 X |
| 3,212,375 | 10/1965 | Suizu | 82/47 |

FOREIGN PATENTS OR APPLICATIONS

| | | | |
|---|---|---|---|
| 564,587 | 10/1944 | Great Britain | 82/74 |

*Primary Examiner*—Harrison L. Hinson
*Attorney*—Patrick F. Henry

[57] ABSTRACT

Bends and elbows for use in larger size pipe, tube or conduit, such as circular and cylindrical sheet metal duct, for the purpose of installation normally come in several different stock sizes and angles and may be made from a series of sections or gores. The present method of making a section at a pre-selected angle is to place the pipe or tube from which the section is to be cut in a jig or fixture in proper alignment for rotation about a constant longitudinal axis, and while the pipe or tubing is rotating bring a cutting blade in cutting contact through the wall of the pipe while sustaining said blade in a movable gimbel or mounting corresponding to the angle desired. One form of the present machine comprises a wheeled base having a pipe or tubing jig thereon comprising adjustable arms which adjust radially from a center with end portions that are inserted inside the end of the tubing to hold same to rotate in alignment about a constant longitudinal center line. A second jig or fixture may be used on the other end of the pipe if desired. An electric motor-driven circular cutting blade with a carbide edge is mounted in a fixed location on a pivotal frame which supports the blade against the wall of the pipe or conduit being cut and the angle of the support of the cutting blade is adjustable from a gear adjustment means. The pipe jig support is rotatably driven to rotate the pipe by means of a large circular gear which rotates the pipe while the cutting blade is making a cut at the desired angle and the cutting blade pivots to cut at an angle on the circular pipe or tubing.

17 Claims, 15 Drawing Figures

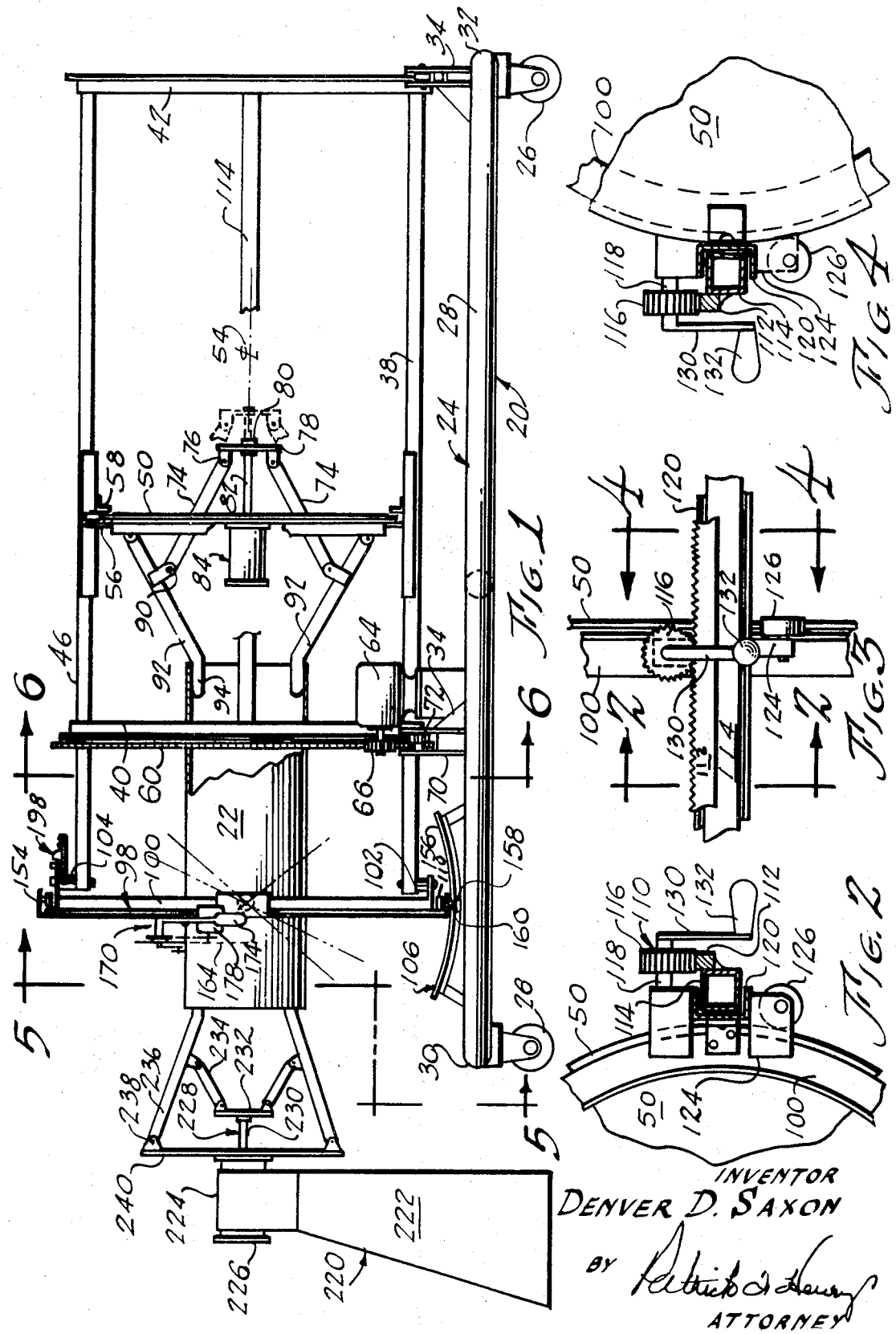

Patented Aug. 7, 1973 3,750,506

INVENTOR
DENVER D. SAXON
BY
ATTORNEY

Patented Aug. 7, 1973

INVENTOR
DENVER D. SAXON
BY Patrick d. Henry
ATTORNEY

Patented Aug. 7, 1973
3,750,506
4 Sheets-Sheet 4
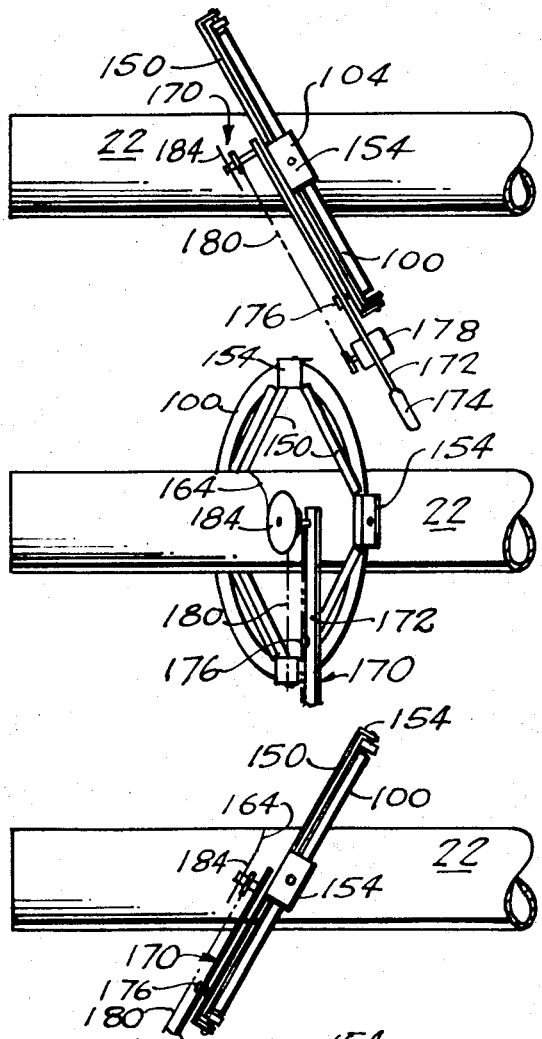
Fig. 11
Fig. 12
Fig. 13
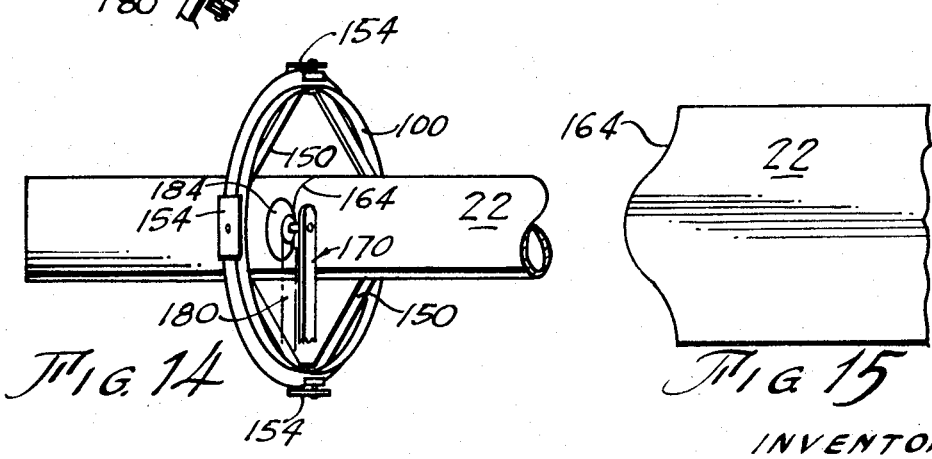
Fig. 14
Fig. 15
INVENTOR
DENVER D. SAXON
BY
ATTORNEY

APPARATUS FOR CUTTING ELBOW SECTIONS FROM PIPE

This application is a division of application Ser. No. 735,903, filed June 10, 1968 and now U.S. Pat. No. 3,589,220 issued June 29, 1971.

BACKGROUND OF THE INVENTION

1. Field of the Invention

Pipe or conduit cutting methods and apparatus. With respect to machines for cutting pipe, it should be noted that in the present machine the pipe rotates and remains in one location except for shifting to correspond with the angle being cut on the circular surface of the pipe.

2. Description of the Prior Art

The well known prior art practiced in many sheet metal shops and the like of course is to use hand cutters such as snippers or compound sheers to follow a line around the surface of the cylindrical tube to make the cut at the proper angle. There are also machines which use a reciprocating blade like a hacksaw blade which is set at an angle to the center line of the pipe and then brought substantially in a straight line through the pipe much as one would cut through a pipe at an angle with a hacksaw blade. The hand method is unsuitable for any type of production work as well as being difficult and producing uneven work. The reciprocating blade arrangement does not make a contoured cut corresponding with the curvature of the exterior of the curved surface and would not be suitable for certain tubing or sheet metal installations and assembly of elbows. The present method and apparatus among other things solves these problems by making an accurate contoured cut through the surface of the pipe or tube and therefore creates an angled end which is exactly correct for assembly into an elbow of a certain angle. Also, whereas some prior art methods and apparatus tend to dent or distort the cylindrical accuracy of the pipe or tubing, the present method and apparatus makes a clean accurate cut without any effective pressure which would distort the cylindrical shape.

SUMMARY OF THE INVENTION

Pipe or tubing is accurately supported for rotation and alignment and a cutting means cuts through the surface of the pipe at a selected angle while the pipe is rotating. The machine comprises a support means for removably supporting the pipe or tubing length for accurate and aligned rotation about a fixed longitudinal center line and a cutting support means has a power driven cutting blade thereon which cuts through the surface of the wall of the pipe at an angle contoured to correspond with the curvature of the pipe. Adjustment means is provided for the support means for the pipe as well as for setting and resetting the angle for the cut.

BRIEF DESCRIPTION OF THE DRAWINGS

Objects, advantages, construction and operation of a form of the invention will be apparent upon reading the following specification taken in conjunction with the accompanying drawings, in which:

FIG. 1 is a side elevation view of one form of the machine for practicing the present method.

FIG. 2 is a enlarged front elevation view of the means for adjusting the machine to vary the pipe lengths.

FIG. 3 is a side elevation view of the adjustment means shown in FIG. 2.

FIG. 4 is a rear elevation view of the adjustment means shown in FIG. 2.

FIG. 11 is a top plan view of the cutting means cutting support frame and cutting blade as the blade starts the cut.

FIG. 12 is a top plan view of the cutting means arrangement shown in FIG. 11, as blade reaches 90° of cut.

FIG. 13 is a top plan view of the cutting means arrangement shown in FIGS. 11 and 12 after the blade has reached the 180° point of the rotation of the pipe and has shifted and is returning for the remaining 180° cut.

FIG. 14 is a top plan view of the cutting means arrangement shown in FIGS. 11, 12, and 13 as blade 270° of cut.

FIG. 15 is a plan of a section of elbow laid out flat to illustrate the cutting means shifting operation.

DESCRIPTION OF A PREFERRED EMBODIMENT

Figure 5:
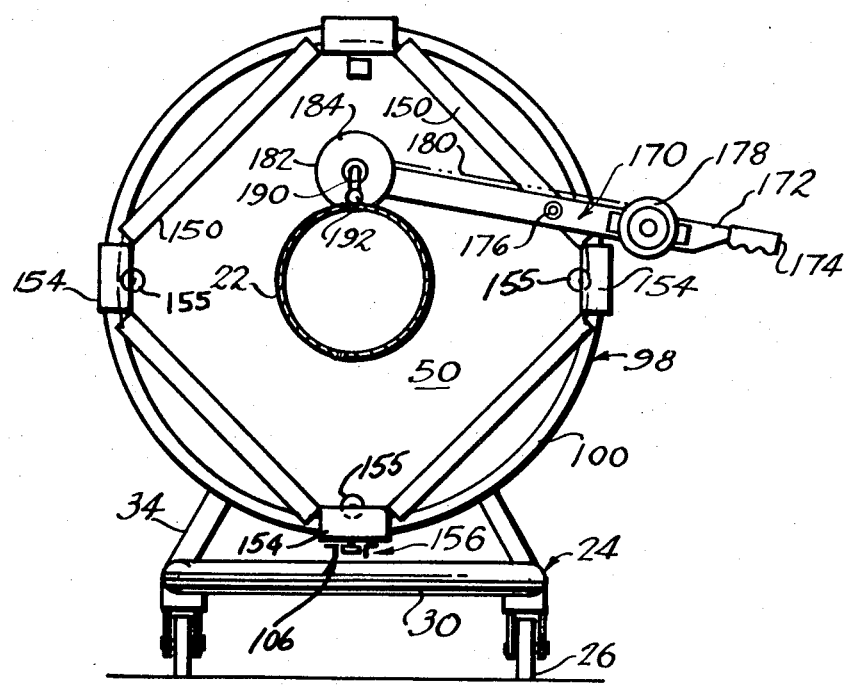
FIG. 5 is a cross-sectional view taken substantially along lines 5—5 in FIG. 1.
Figure 6:
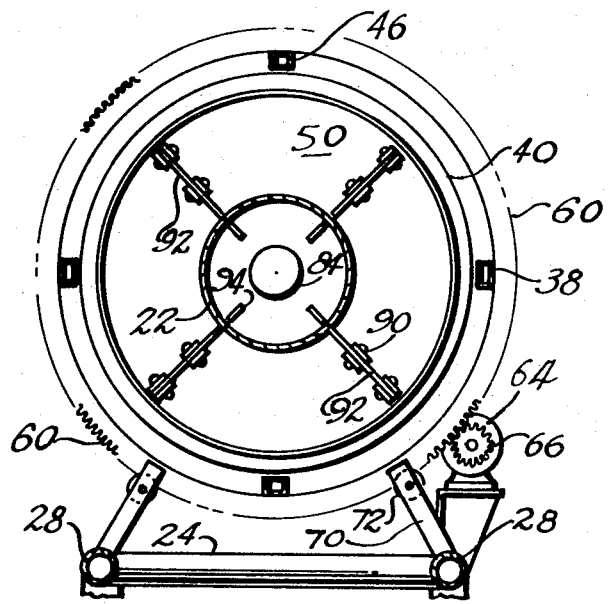
FIG. 6 is a cross-sectional view taken substantially along lines 6—6 in FIG. 1.

It should be understood in reading the following specification that the work is being performed on a cylindrical pipe, tube or conduit which may be sheet metal or may be seamless metal or plastic tube or any other elongated, cylindrical conduit which has a wall thin enough to be cut. The present method and apparatus will cut any cylindrical conduit as long as the material can be cut by a rotating carbide cutting blade or substitute arrangement. Therefore, when used throughout this specification the word pipe or tube or cylindrical conduit are used interchangeably and do not refer to the particular material or purpose for which the pipe, tube or conduit is being used. The purpose of the present machine is to cut sections from such pipe, tube or conduit and which sections may be used as part of an elbow or bend according to the angle the section has been cut by the present method and machine.

The machine is referred to generally and overall herein by reference numeral 20 and performs its work on a piece of pipe, tube or conduit 22 as referred to in the preceding paragraph.

Machine 20 comprises a frame means having a rectangular bottom support frame 24 movably supported on wheels 26 whereby the entire machine 20 may be moved by rolling from location to another. Frame 24 is made from tubular stock bent into a rectangular shape having sides 28 and a front end 30 and a rear end 32. Inclined frame members or plates 34 extending upwardly from opposite sides of the machine at spaced locations support a rotational pipe support means comprising longitudinal frame members 38 of which there are several spaced radially. Longitudinally spaced, movable rings 40, 42 are attached to the members 38 and extend therearound and are part of a rigid, cylindrical frame structure of the pipe support means which includes upper longitudinal angle iron frame members 46 welded or otherwise secured to the rings 40, 42 which with the frame members 38 and the supports 34 on the frame 28 provide a movable support means. The frame structure including rings 40, 42 and the longitudinal tubes 38 and 46 are supported for rotation in bearings on the frame members on plates 34.

A substantially solid, circular plate 50 on a ring 51 has radial openings 52 therein and is supported for selective rotation for purpose of adjustment only to select the starting position of the pipe about the longitudinal center line 54 in circumferentially spaced bearing members 56 comprising channels 58 confining the edge of the plate 50 for accurate rotation for adjustment therein. Plate 50 is normally fixed to ring 51 to rotate therewith and part of the support means for the pipe 22.

A large ring gear or slide gear or bull gear 60 is supported on and outside the frame members 38, 46 and substantially transverse to the longitudinal centerline 54 and is connected by to the ring 40 to rotate same. Gear 60 is driven by means of an electric motor 62 driving a drive gear 66 which meshes with the external gear surface of gear 60 which is supported in bearing channel members 70 having roller bearings 72 therein.

The pipe support means includes a jaw or chuck arrangement comprising four pivoted arms 74 each pivoted at one end 76 to a plate 78 having a collar 80 to which is attached a shaft 82 that is the piston rod of a pneumatic air cylinder device 84 controls from an air valve (not shown) from an air line 86. Each arm 74 is pivoted at the end opposite from pivot 76 on a pivot means 90 intermediate a pipe support member 92 having an end portion 94 inserted inside the open end of the pipe 22 and aligning and positioning same with the longitudinal center line of pipe 22 coincident with and in proper alignment with the center line of the gear 60 and also aligned with a forward cutting support means 98 comprising a ring member 100 which is pivotally mounted at the top and bottom on pivots 102, 104 on respective frame members 38, 46 so that the ring 100 will pivot substantially in the manner shown in FIGS. 11 through 14, inclusive. The cutting support means 98 includes a part that is shiftable fore and aft on a ring quadrant and bearing arrangement 106 by means of a roller bracket assembly designated generally by reference numeral 110 and shown in more detail in FIGS. 1 and 5. It is worthwhile to note that the ring 100 rotates with the pipe 22 inside the ring but the ring 100 is shiftable to allow the set of the angle of the cut as will appear hereinafter and also is movable on the pivots 102, 104 as shown in FIGS. 11 through 14, inclusive, to allow the cutting blade to make the proper movement from the first one-half which is 180° of a 360° cut determined by the complete rotation of the pipe 22. Reference to FIGS. 11 thru 15, illustrates that as the pipe rotates the cutting blade 184, depending upon the angle to be cut, travels down the surface of the cylindrical pipe until it reaches the end of the first half of the cut at 180° whereupon the blade must reverse as shown in FIGS. 11 thru 14, inclusive, in order to make the remaining 180° of the 360° travel. The angle of the cut is determined by the angle of the plane diametric axis of the circumference of the blade 184 which is determined by an adjustment means 198.

The length of pipe is adjusted by an adjustment means 111 comprising a rack 112 fixed along a frame member portion 114 and a gear 116 carried by a shaft 118 mounted on a channel 120 which loosely engages one edge of the ring 50 and the gear 116, the shaft 118, and the channel 120 are movable with respect to the rack 112 on the member 114 so as to move the entire support means 50 to adjust the length of the pipe 22 along the center line 54 thereby to determined the amount of pipe which is fed to be cut.

Another bracket 124 with a channel therein fitting around the periphery of the plate 50 has a roller bearing 126 which engages the peripheral surface of the plate 50 and assists in maintaining it in rotational alignment. There is an identical adjustment arrangement 110 on the other side of the machine carried on longitudinal frame member 46 and including the same corresponding rack 112, gear 116 and bracket arrangements 120, 124 with roller 126.

Both of the shafts 118 have a handle 130 thereon with a knob 132 whereby the handle may be rotated by hand to move the gear 116 in the teeth of the rack 112 thereby moving the entire ring 50 and all of the pipe support means either forwardly or rearwardly along the center line 54 to adjust the length of pipe which projects from the end of the machine.

The cutting means is designated generally by reference numeral 98 and referring initially to FIG. 5 it will be seen that the ring 100 is movable on the pivots 102, 104, as mentioned previously. Ring 100 rotates within a floating cutting frame 150 having angle iron braces which are attached to bearing blocks 154 with wheels 155, there being four wheels 155 spaced 90° apart around the circumference of ring 100. The bottom of the ring 100 is supported in a bearing block 154 on a quadrant slide member 156 of arrangement 106 by means of a loose connection 158 including a slide 160 which allows the ring 100 to rotate as well as pivot in the pivots 102, 104, as mentioned previously. However, the connection 158 is loose by means of a wheel 162 sliding in the quadrant member 156 to allow the relative movement adjustment of the plane of the circumference of the face of the ring 100 with respect to the center line 54 through the pipe 22 as illustrated by the dotted lines in FIG. 1 and the cutting frame 150. This is the means whereby the angle of the cut designated by reference numeral 164 is determined which determines the angle of the cut with respect to the center line or pipe 22 and whereby the blade 184 can move as the pipe 22 is cut.

Figure 10:
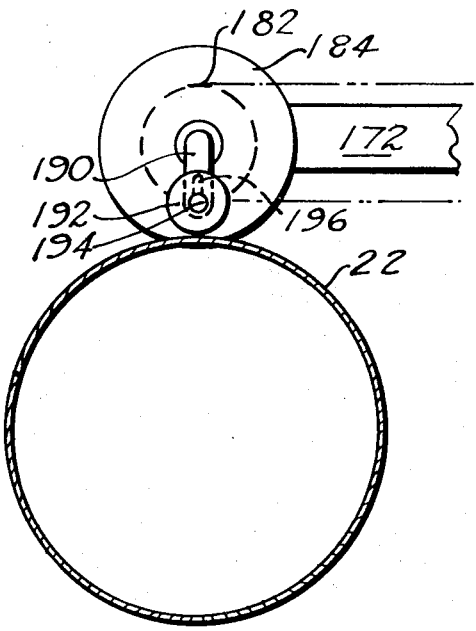
FIG. 10 is an enlarged elevation view of the rotary cutting blade in contact with a tube or pipe to be cut.
Figure 9:
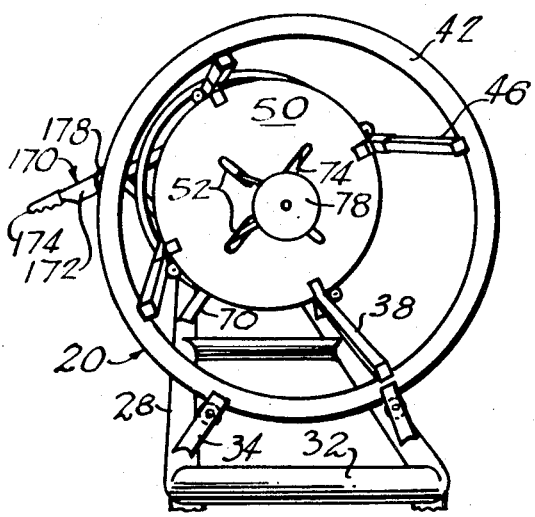
FIG. 9 is a rear perspective view of the machine shown in FIG. 1 without any pipe therein.

The manually operated cutting means is designated generally by reference numeral 170 and it comprises a cutting arrangement including an arm 172 with a handle 174 and supported on a pivot 176 on one of the frame members 150 as shown in FIG. 5. An electric motor 178 by means of a belt 180 drives a pulley 182 having a circular cutting blade 184 attached thereto. The center of the pulley 184 supports a bracket member 190 on which is rotatably attached a wheel 192 on a shaft 194. The periphery of wheel 192 contacts the surface of the pipe 22 and determines the depth of the cut of the edge of the blade through the wall of the pipe 22 by limiting the amount of the penetration as shown in FIG. 10. Wheel 192 may be adjusted by adjusting shaft 194 in a slot 196 to increase or decrease the depth of cut of the edge of the blade 184 as required by the thickness of the wall of the pipe 22.

Figure 7:
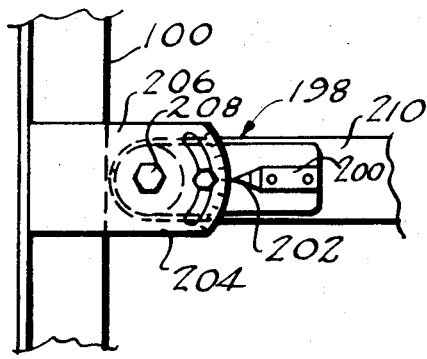
FIG. 7 is an enlarged plan view of the angle indicator of the adjustment means for the cutting means.
Figure 8:
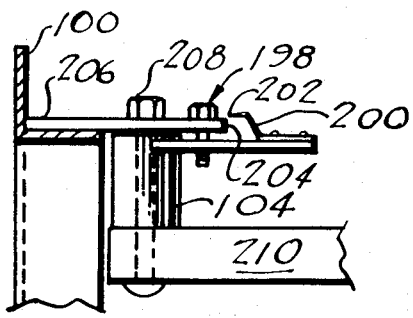
FIG. 8 is an elevation view of the angle indicator shown in FIG. 7.

A means for setting the angle of cut is provided as seen in FIGS. 7 and 8 in the form of an angle indicator arrangement designated generally by reference numeral 198 and comprising a fixed indexed pointed 200 with a tip 202 pointing to and reading adjacent a portion of an angle indicator or protractor scale 204 which is fastened on a bracket 206 mounted with the ring 100 and being pivotally mounted on a bolt pivot 208 through one of the frame members 210 or 46. Starting at zero point when the ring is perfectly vertical with respect to the center line 54 the angle indicator "0" and then will be calibrated with angles indicated plus and minus in respective directions.

An alternative and additional support means for pipe 22 is represented by reference numeral 220 in general arrangement and is shown at the left-hand side of FIG. 1 and comprises a floor support base 222 which may be constructed from angle iron or other material to make a rigid pillar support having a journal bearing portion 224 at the top thereof in which is mounted a bearing 226 having a hydraulic piston and cylinder arrangement 228 similar to the hydraulic cylinder 84 and including a piston rod 230 attached to a plate 232 carrying arms 234 similar to arms 74 and arms 234 are connected at opposite ends respectively to plates 232 and to respective jig, fixture or mandrel support arms 236 which have each of one respective end thereof pivotally connected at 238 to a support plate 240 mounted with the bearing support portion 224. The operation of the pipe support 220 is substantially the same as the operation of pipe support 78 both serving to position, align and support the ends respectively of the pipe 22 and to provide a quick, effective and simple manner both for attachment and detachment of the pipe. There may be times when the front end support arrangement 220 will not be used and may not be located with the portable machine 20. However, there will be times when it may be desirable to support the front end of the pipe 22 as well as the inner or back end of the pipe. Both of the arrangements including the respective arms 92 and 236 act as retractable or movable chucks or mandrels which move and pivot into and out of position in the inner end of the pipe 22.

After the proper angle has been selected for the cut on the pipe 22 as determined by the setting of the indicator 200 as mentioned previously, with reference to FIGS. 11 thru 14, inclusive, it is seen that the cutting blade 182 which preferably has a diamond or carbide edge rests on the periphery of the pipe 22 starting at the top which is being looked down upon in FIG. 11. As the blade 184 rotates, the pipe 22 is rotated beneath the blade with the blade edge penetrating the wall of the pipe 22 as shown in FIG. 10. The blade which is carried by frame 150 continues to cut as the frame 150 pivots in the respective pivots 104, 102 which is necessary in order to permit the blade to shift from the first 90° through FIG. 12 until it travels the full 360° through FIG. 14 making a cut like that found in FIG. 15.

While I have shown and described a particular apparatus for cutting elbow sections from pipe together with a suggested method for performing this operation, this is by way of illustration only and does not constitute any sort of limitation on the scope of the invention as various alterations, changes, deviations, eliminations, substitutions, additions, variations, omissions, combinations and departures may be made in the embodiment and the method shown without departing from the scope of my invention as defined by interpretation of the appended claims.

What is claimed:

1. In an apparatus for cutting tube or pipe or the like at a biased angle to the axis thereof:
   a. a support frame,
   b. pipe positioning means on said support frame for detachably positioning and retaining the pipe for rotation thereon about the longitudinal center line of the pipe,
   c. means on said support frame for rotating said pipe substantially about a longitudinal axis through said pipe,
   d. cutting means positionable against said pipe to cut said pipe at a biased angle to the longitudinal axis thereof as said pipe is rotated, said cutting means being movably mounted on said support frame for engagement into said pipe at a biased angle as said pipe rotates on said support frame.

2. The apparatus claimed in claim 1; said cutting means being preset at an angle corresponding with the angle to be cut on said tube.

3. The device claimed in claim 2: said cutting means being a cutting blade mounted on a shiftable frame, and means for presetting said cutting means to determine the angle of said cut.

4. The device of claim 3: said means for determining the angle of the cut comprising a movable support for said cutting means and a means for fixing said support in position at a preselected angle.

5. The device claimed in claim 1: said cutting means comprising a circular cutting blade, said cutting blade being mounted on a cutting blade support frame, said cutting blade support being mounted for limited movement to determine the angle of cut of said cutting means, said tube or pipe being rotated while said cutting means is in contact therewith, means for presetting the angle of said cutting means by changing the angular position of said cutting frame with respect to the longitudinal axis of the pipe, and means for setting said cutting means in place at said angle.

6. The device claimed in claim 1: said cutting means comprising a cutting edge in contact with said tube or pipe as said tube or pipe is rotated relative to said cutting edge, said cutting edge being shiftable with respect to an axis therethrough so that said blade may change position to compensate for an angular cut in said pipe.

7. The device claimed in claim 6: said cutting blade being a circular blade having a cutting edge which is rotated, said cutting blade being mouned on a support frame, said support frame being mouned for limited movement to adjust the angle of said blade, and means for presetting the angle of said support frame for said blade to preset the angle of cut.

8. The device claimed in claim 1: there being a pipe support means insertable at one end of said pipe and being retractable therein, and means on said frame operable to extend the length of said pipe with respect to said cutting means to determine the length of pipe to be cut.

9. The device of claim 8: said means for determining the length of cut comprising a movable support for said means insertable in and removable from said pipe, said support being movably supported on said support frame.

10. The device of claim 9: said means insertable in and removable from said pipe comprising arms having in portions fitted into the open end of said pipe, and link members connected to said arm for moving same to retract same from said pipe, and control means for operating said means.

11. The device of claim 10: said link means being operated by fluid control, and control means for said fluid control.

12. The device in claim 10: said link means being mounted on a movable support frame which is adjustable to adjust the length of pipe to be cut, and control means for moving said movable frame.

13. The device of claim 12: said control means comprising a ratchet and a gear having a control handle thereon operable to move said ratchet and to move said movable support.

14. In an apparatus for cutting tube, pipe or the like:
   a. support frame,
   b. pipe positioning means on said support frame for detachably positioning and retaining the pipe,
   c. means for rotating said pipe substantially about a longitudinal axis through said pipe,
   d. and cutting means positionable against said pipe to cut said pipe as said pipe is rotated,
   e. there being a pipe support means insertable at one end of said pipe and being retractable therein, and means on said frame operable to extend the length of said pipe with respect to said cutting means to determine the length of pipe to be cut,
   f. said means for determining the length of cut comprising a movable support for said means insertable in and removable from said pipe, said support being movably supported on said support frame,
   g. said means insertable in and removable from said pipe comprising arms having end portions fitted into the open end of said pipe, and link members connected to said arm for moving same to retract same from said pipe, and control means for operating said means.

15. The device in claim 14: said link means being operated by fluid control, and control means for said fluid control.

16. The device in claim 14: said link means being mounted on a movable support frame which is adjustable to adjust the length of pipe to be cut, and control means for moving said movable frame.

17. The device of claim 14: said control means comprising a ratchet and a gear having a control handle thereon operable to move said ratchet and to move said movable support.

* * * * *